United States Patent [19]

Lee

[11] Patent Number: 5,553,286
[45] Date of Patent: Sep. 3, 1996

[54] SYSTEM AND METHOD FOR PREPARING A COMPUTER PROGRAM FOR EXECUTION

[75] Inventor: Richard E. Lee, Milpitas, Calif.

[73] Assignee: International Business Machines Corporation, Armonk, N.Y.

[21] Appl. No.: 214,735

[22] Filed: Mar. 17, 1994

[51] Int. Cl.⁶ .................................................. G06F 9/445
[52] U.S. Cl. ............................................................ 395/650
[58] Field of Search ........................................... 395/650

[56] References Cited

U.S. PATENT DOCUMENTS 5,247,675  9/1993  Farrell et al. ........................... 395/650
5,459,865  10/1995  Heninger et al. ....................... 395/650

OTHER PUBLICATIONS

MVS/Extended Architecture Linkage Editor Logic, IGM Data Facility Product 5665–XA2, Version 2, Release 1.0.

*Primary Examiner*—Thomas M. Heckler
*Attorney, Agent, or Firm*—Esther E. Klein

[57] ABSTRACT

A new format of executable program is provided which is flexible and open-ended to provide a means for storing heterogeneous program data in an executable program. In a computer system having a central processing unit, memory, and a storage device, a system and method of executing a computer program is provided for converting one or more source programs into an executable program. The data from the object modules are arranged according to a set of predefined classes. Each class of data is written out to memory keeping data from the same class stored together. Only the data in classes needed for running the program are loaded into memory. As data is required to continue running the program, it is read into memory. A directory is maintained of where each class is stored on the storage device.

8 Claims, 6 Drawing Sheets

SYSTEM AND METHOD FOR PREPARING A COMPUTER PROGRAM FOR EXECUTION

FIELD OF THE INVENTION

This invention relates to the field of compiling, loading and executing a computer program.

BACKGROUND OF THE INVENTION

A computer program, as written by a programmer, is not in a form which can be executed by the computer. It first must be processed into an executable format and placed in computer memory. The process of converting a programmer's source program into an executable module involves a series of steps performed by the central processing unit (CPU).

The programmer writes a program using a computer language which is best suited to the application. Some languages, such as COBOL, are more appropriate for commercial applications, whereas others, such as FORTRAN, are more suitable for scientific applications. Assembler programs, because of their high degree of programmer control, are best suited for systems programs and other performance sensitive applications. These programs, referred to as source programs, consist of data declarations and instructions which operate on that data. All addressing is symbolic, which means that the programmer assigns labels (names) to individual data elements and instructions, then refers to those names elsewhere in the program.

A compiler or assembler processes the source program and produces an object module. Program listings and diagnostics are printed during this process. Each computer language requires its own compiler or assembler. Some compilers can produce object modules for more than one operating system or processor; however, an assembler is normally specific to a single processor, since its instruction set is closely tied to that of the processor itself. The methods used by the compiler or assembler to convert a source program to an object module are well known to those skilled in the art of computer science.

The object module consists of the program's instructions and data in a machine-processable format, but it is still not in a form which can be executed. In addition, the generated machine instructions do not generally invoke operating system functions directly, but require additional service routines for input/output, resource management, etc.

Each object module consists of one or more control sections (CSECTs), segments of the program which are separately relocatable (i.e. can be replaced, deleted or moved around within the module). Some compilers generate multiple control sections, one for the instructions, one for the local data items, and one for each external data item (referred to as a common section).

Symbolic references from within one control section to instruction or data labels in another are known as external references. Each such symbolic reference is represented by an External Symbol Dictionary (ESD) entry and one or more address constants (adcons) stored with the executable portion of the module.

The object module is a file of fixed-length records, consisting of the following record types:

Internal Symbol Dictionary (SYM) Data describing the internal symbols (those known only within the same control section). SYM records are used for debugging purposes.

External Symbol Dictionary (ESD) Data describing each external label and external reference in the module.

Text—Instructions and data of the program in machine processable format. Text records also contain additional control fields which specify the length and placement of the text within the object module or control section.

Relocation Dictionary (RLD)—Data describing each address constant in the program.

Identification Records (IDR)—Data providing additional descriptive information about the CSECT, such as the compiler which produced it, any maintenance applied to it, etc.

An end-of-module indicator (END).

Common library subroutines are used for additional functions not provided in the object module by the compiler. Some program functions, such as input/output, require the services of the operating system. In order to make the object module as independent as possible of the operating environment, such services are obtained through the use of library routines. Each operating environment has its own version of these library routines, thereby providing a degree of independence between the object module and the system, or platform, on which it will execute.

It is the job of the linker, a processing program of the operating system, to combine the object modules into a single load module, adding any needed library routines. An example of a linker is the OS Linkage Editor linker program from the IBM corporation used by the IBM MVS, CMS and VSE operating systems. It provides a number of capabilities, selectable via control statements. The linker combines any number of object modules and Load modules into a single load module; replaces, deletes, re-orders, aligns and renames control sections within the load module; renames or deletes external symbols; reserves storage in the load module for common sections, when storage has not been provided in the object module by the compiler; performs an automatic library call to bring in any required library routines; calculates relative (to the start of the load module) addresses for every label in the module, storing the correct address in each of the module's address constants; writes the resultant load module into a program library under a name assigned by the programmer; adds any aliases or alternate entry point names to the library's directory; and prints a module map, cross reference listing and diagnostics, when required.

Linking can take place at different times during the development cycle. Static Linking is the type of linking performed by a Linkage Editor. The modules are linked together in a separate job or job step, and the resultant load module is stored in a load module library for later execution.

Load-time Linking takes place immediately before program execution. Load-time linking is done by a linker-loader and offers a number of advantages. The separate job or job step needed for static linking is eliminated and there is no requirement for saving a load module or load module library on DASD. Also, late binding guarantees that the library routines used in the linkage process are at the latest level. The primary disadvantage of load-time linking is that the program must be completely re-linked every time it is run.

Dynamic Linking is where a subroutine is loaded and linked during execution of the main program, at the time it is first needed.

The load module (also called the executable program) is the form of a computer program suitable for loading into memory for execution. The IBM System/360, System/370 and System/390 system load modules contain the program's machine instructions and data as well as additional control and identification information necessary to load, re-link and maintain the module.

The load module is an almost-executable version of the combined program. It is always stored on a non-volatile memory such as a direct access storage device (DASD) and consists of the following record types:

- Combined Internal Symbol Table (SYM)—a collection of the SYM records from all object modules comprising the load module;
- Combined External Symbol Dictionary (CESD)—a collection of every external symbol in the load module;
- Text—instructions and module data;
- Control Records—a collection of the length and placement of the text record which follows;
- Relocation Dictionary (RLD)—data describing the location and type of each address constant in the previous text record;
- Identification Records (IDR)—data providing additional information about the control section, such as compiler ID and the time and date of any applied maintenance.

Symbol table data (SYM and ESD) are located at the beginning of the module. Text, control records, RLD and IDR are interspersed by control section.

Load modules are usually platform-specific and not easily extended. Individual control records within the module consist of fixed, non-expandable fields which limit the size and flexibility of the module. The fixed structure of the load module places many limitations on the size, flexibility and usability of this format. Modules normally consist of various record types each of which has a specific function, thereby limiting the types of data which can be contained therein. These inherent restrictions in the load module format have severely limited its flexibility and usability.

A loader reads a portion of the DASD-resident load module into virtual storage and prepares it for execution. When loading load modules the first step is to obtain a block of storage large enough to contain the entire program. The storage must be in an address range and have storage protection characteristics suitable for the module being loaded. Next, the text records are read into the newly obtained storage, incrementing all relocatable address constants by the starting location of the module in memory.

As mentioned earlier, linking and loading can be combined into a single step, thereby saving some processing time and eliminating the need for a load module. In situations, such as program checkout, where continual program changes are expected, the link-load approach will provide the best overall performance. However, in normal production environments, where programs are executed over and over, loading from a load module library will provide superior performance and the best system utilization.

Once the module is located in virtual storage it is ready for execution. In some environments, additional system preparation is required outside of the loaded module, such as the building of task and resource management control blocks, before the program can begin executing. Depending upon how the module was loaded, control may be passed to the loaded module or its address may be returned to the caller who issued the load. In either case, the module is fully executable. Any changes which take place within the module after this time, whether intentional or inadvertent, will not be reflected back into the DASD-resident load module or any other form of the stored program.

There are a number of problems with the current designs of load modules and the manner in which the modules are loaded into memory. There are physical size limitations of the executable portion of the load module. Usually, modules have size limitations such as not being larger than 16 Mb and have limitations on the number of control sections (CSECTs) such as not containing more than 32767 control sections. External names, those symbols known between CSECTs within the module, also have limitations such as not being longer than eight bytes. There is also no way in which to store additional data in a load module. Application programs often process load modules as data, and need a place to store debugging, statistical and other data in the module without reusing existing data structures intended for other purposes. There is also no allowance for variable loading characteristics within the module. Some parts of a module can operate above 16 Mb. in memory, other parts cannot. Some parts can be shared, others cannot. The current load module design requires that the entire module be loaded into consecutive storage locations, making it difficult for the operating system to discriminate between module parts with different characteristics.

There is a need to be able to group parts of a load module with similar loading characteristics, other than by ordering and aligning the control sections, which is error prone and not user-friendly. There is also a need to be able to group the CSECTs of a single compilation unit so that they can be processed as a single entity. The association between CSECTs is lost during linking, so that parts of a compilation unit can be inadvertently replaced or deleted with a corresponding loss of data integrity and possible program failure during execution.

The sequential, record-oriented design of the load module requires that the entire module be read into memory and its address constants relocated (adjusted) before any part of the program can begin executing. For very large load modules this significantly increases the response time and amount of paging activity in the system.

One or more of the foregoing problems are overcome and one or more of the foregoing needs are fulfilled by the present invention.

SUMMARY OF INVENTION

It is an object of this invention to provide a new type of linker, called a binder. The binder performs all of the functions of a linkage editor, producing a program object as an alternative to the load module.

It is a further object of this invention to provide a new type of load module (executable program), called a program object, that is more flexible and open ended.

In a computer system having a central processing unit (cpu), memory, and a storage device, a method is provided for converting one or more object programs into an executable program. The data from the object modules are arranged according to a set of predefined classes. Each class of data is written out to memory keeping data from the same class stored together. Only the data in classes needed for running the program are loaded into memory. As data from a class not in memory is required to continue running the program, it is read into memory. A directory is maintained of where each class is stored on the storage device.

In one form of the invention, an executable program object format is provided comprising an index file array of classes of data from each object module and a format file containing information on the data in the index file.

DETAILED DESCRIPTION OF THE INVENTION

This invention provides a new format for an executable program, referred to as a program object, which provides the functionality of the load module on IBM System/370 and System/390 processors. The invention will be described as the executables would appear in a program library on a direct access storage device (DASD) or in virtual storage after being loaded by a system loader. Details of the design implementation which are not essential to the concept or its understanding and are well known to those skilled in the art are not described in detail. The invention also encompasses systems and processes which create and load into the computer memory the new program object.

The universal program object is a flexible, open-ended design for storing heterogeneous program data in an executable program. While described herein specifically for the IBM System 370 and System/390 environments, the concepts and architecture could be implemented on any platform.

Figure 1:
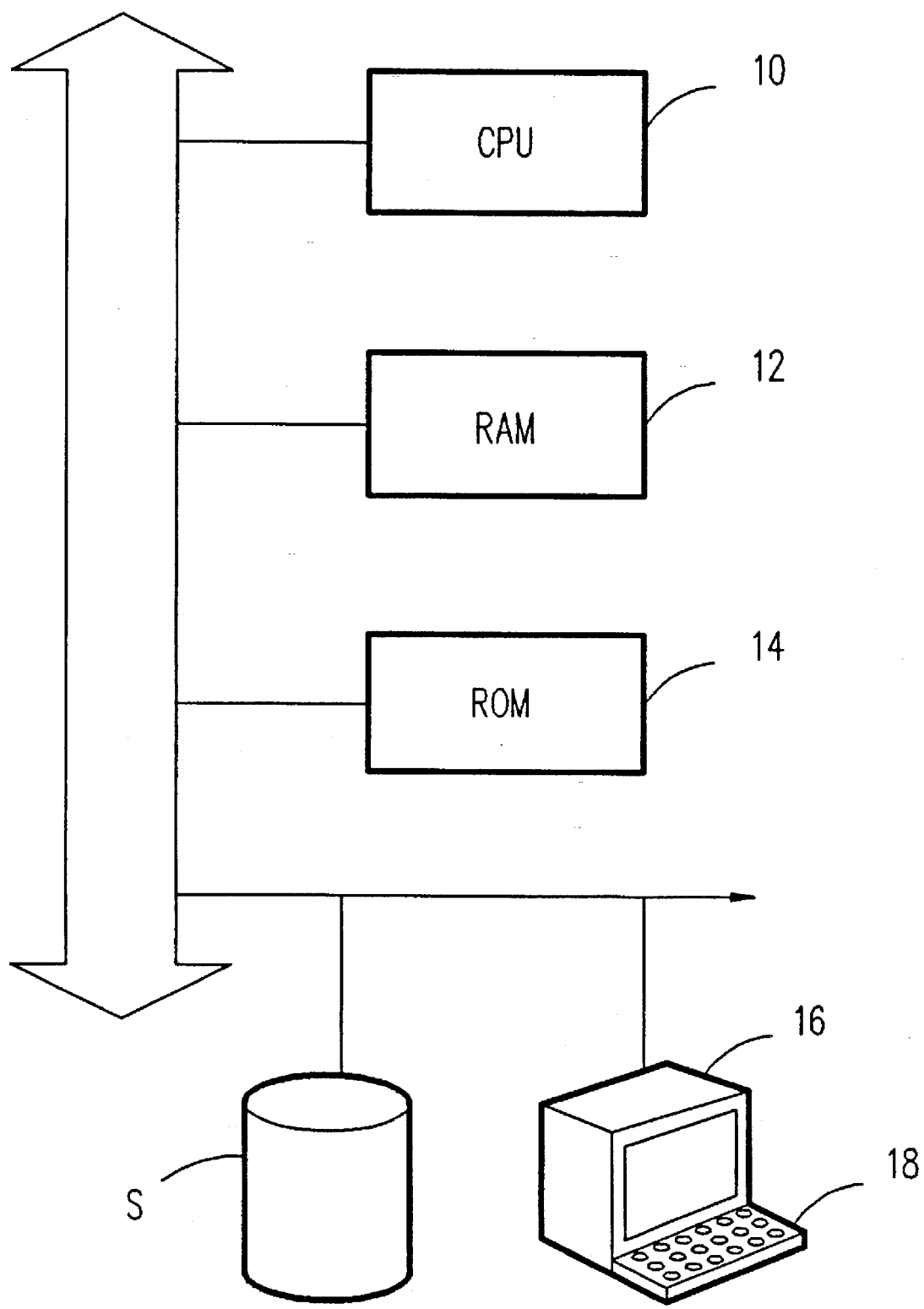
FIG. 1 is a block diagram of a computer system architecture used by the invention.

Referring to FIG. 1, the data processing system which may be utilized for implementing the method and system of the present invention includes a processor 10, a random access memory or RAM 12, a read only memory or ROM 14, at least one non-volatile storage device 15, a computer display monitor 16 and a keyboard 18.

There are many variations of the computer system shown in FIG. 1 known to those skilled in the art for providing the data processing system used in the present invention. There are many variations of the system shown in FIG. 1 known to those skilled in the art for providing the storage management system of the present invention.

The invention specification procedures may be implemented using standard programming and/or engineering techniques. The resulting program or programs may be stored on disk, diskettes, memory cards, ROM or any other memory device. For execution, the program may be copied into the RAM of the storage management system server. One skilled in the art of computer science will easily be able to combine the software described with appropriate general purpose or special purpose computer hardware to create a computer system embodying the invention.

Figure 2:
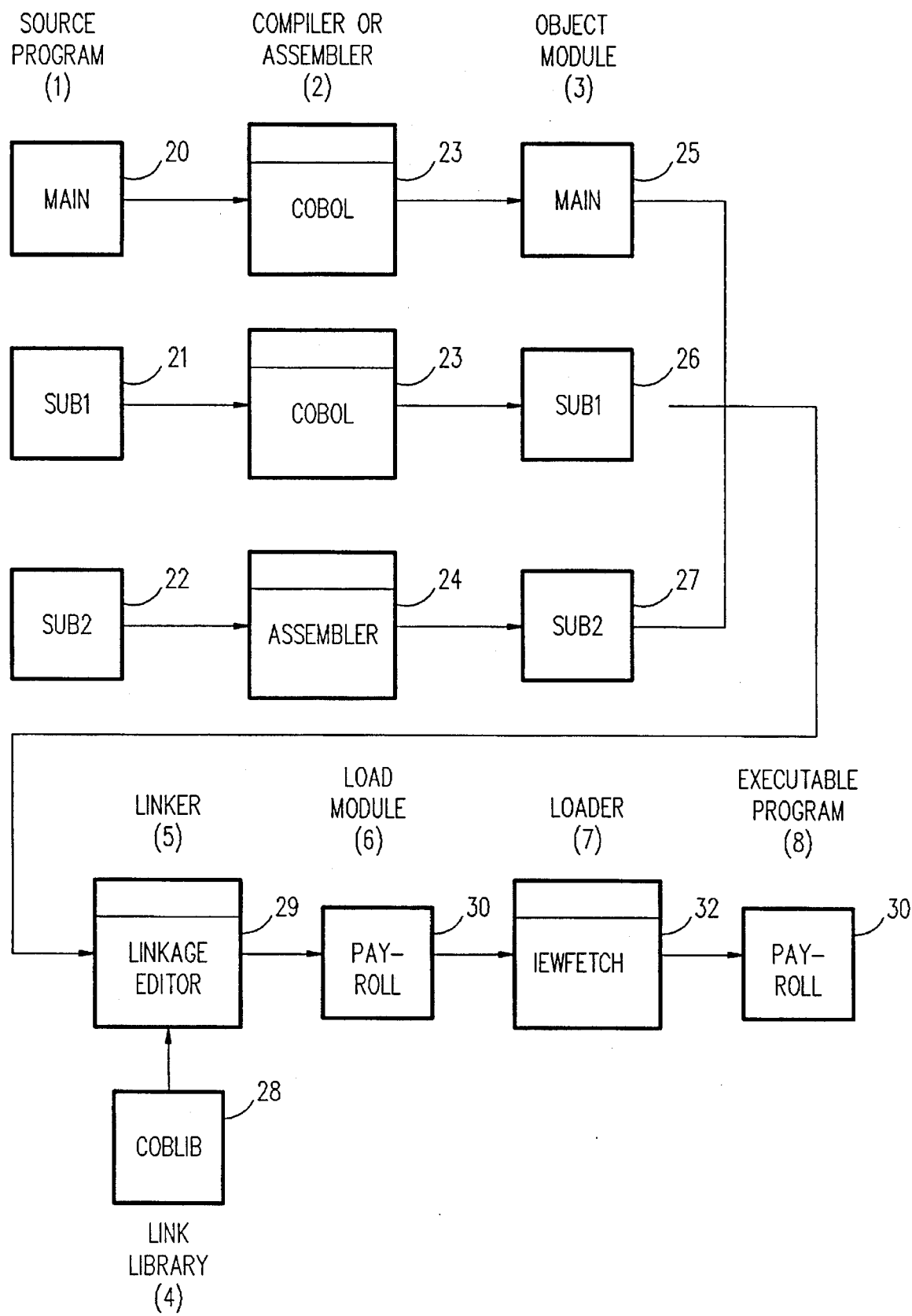
FIG. 2 is schematic diagram of the transformation flow from source program to executable program.

Referring to FIG. 2, the process for converting a source program into an executable module is shown for three related programs, a main program, MAIN, and two sub-programs, SUB1 and SUB2 for a program which runs the payroll for an enterprise. The main program and one of the subprograms are written in the COBOL programming language while the other sub-program is written in a lower level assembly language. The three programs are converted from source form to a single, executable module stored in virtual storage. The three programs were created by a programmer, and are separately compiled, linked together into a single module, and then loaded into computer memory and executed. The composition of the final program will vary according to the complexity of the application, and could consist of a single small program or a large, complex structure consisting of a thousand sub-programs or more. The focus of this invention is the load module and the programs which process it.

As is well known to those skilled in the art, source programs 20,21,22 are processed by compilers 23 and assemblers 24 into object modules 25,26,27. In FIG. 2, the application consists of three such object modules 25–27, none of which can execute by itself. The object modules are then linked together with library routines 28 by a linker 29 to form a load module 30 that is stored on the storage device 15. A loader 32 then reads a portion of the load module from the storage device 15 into the computer memory 12 for execution by the cpu 10.

Figure 3:
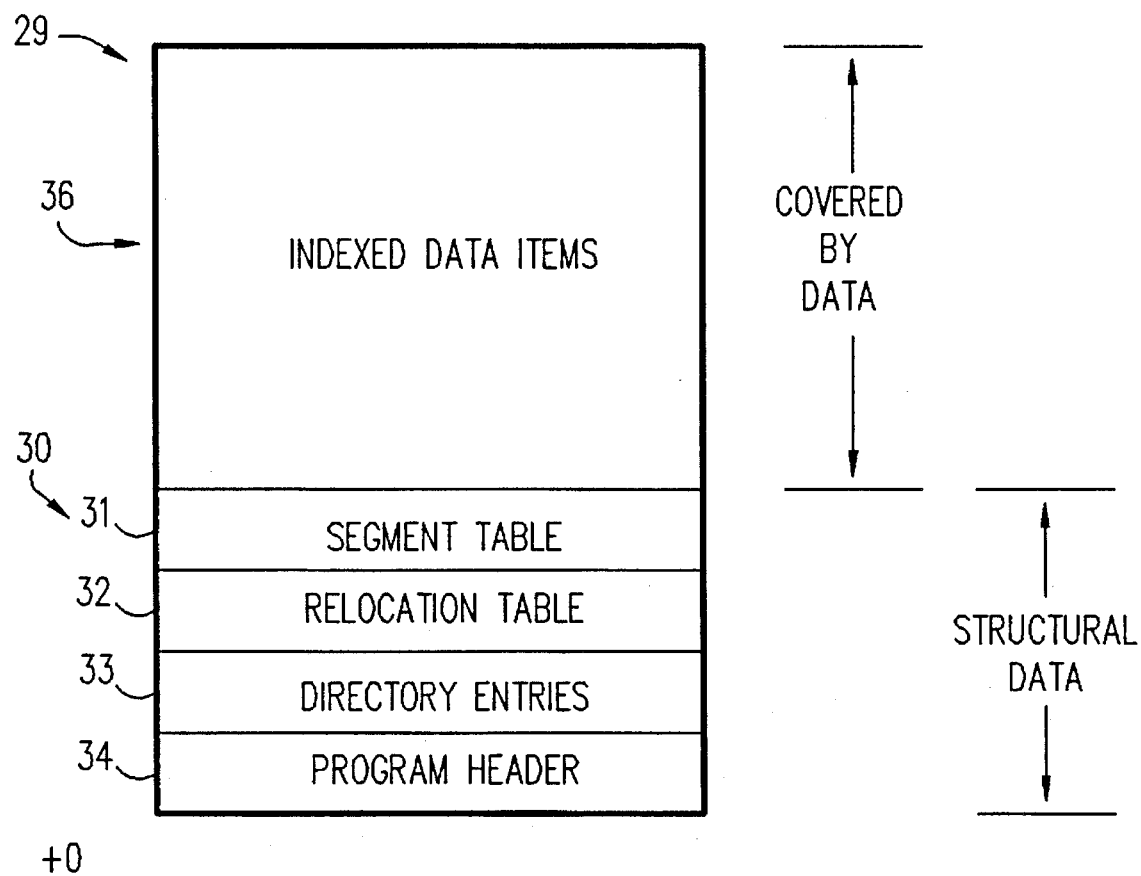
FIG. 3 is a schematic diagram of a program object according to the invention.

Referring to FIG. 3, the program object 29 consists of structural information 30 and an indexed collection of data items 36. The structural data defines the physical layout of the program object and comprises the segment table 31, relocation table 32, directory entries 33, and program header 34. It is environmentally dependent and is not accessible to the end user or user applications. The set of indexed items 36 constitutes the preponderance of program object data, that which has traditionally been thought of as module data, and is accessible to all users through utility programs and defined Application Programming Interfaces (APIs).

Figure 4:
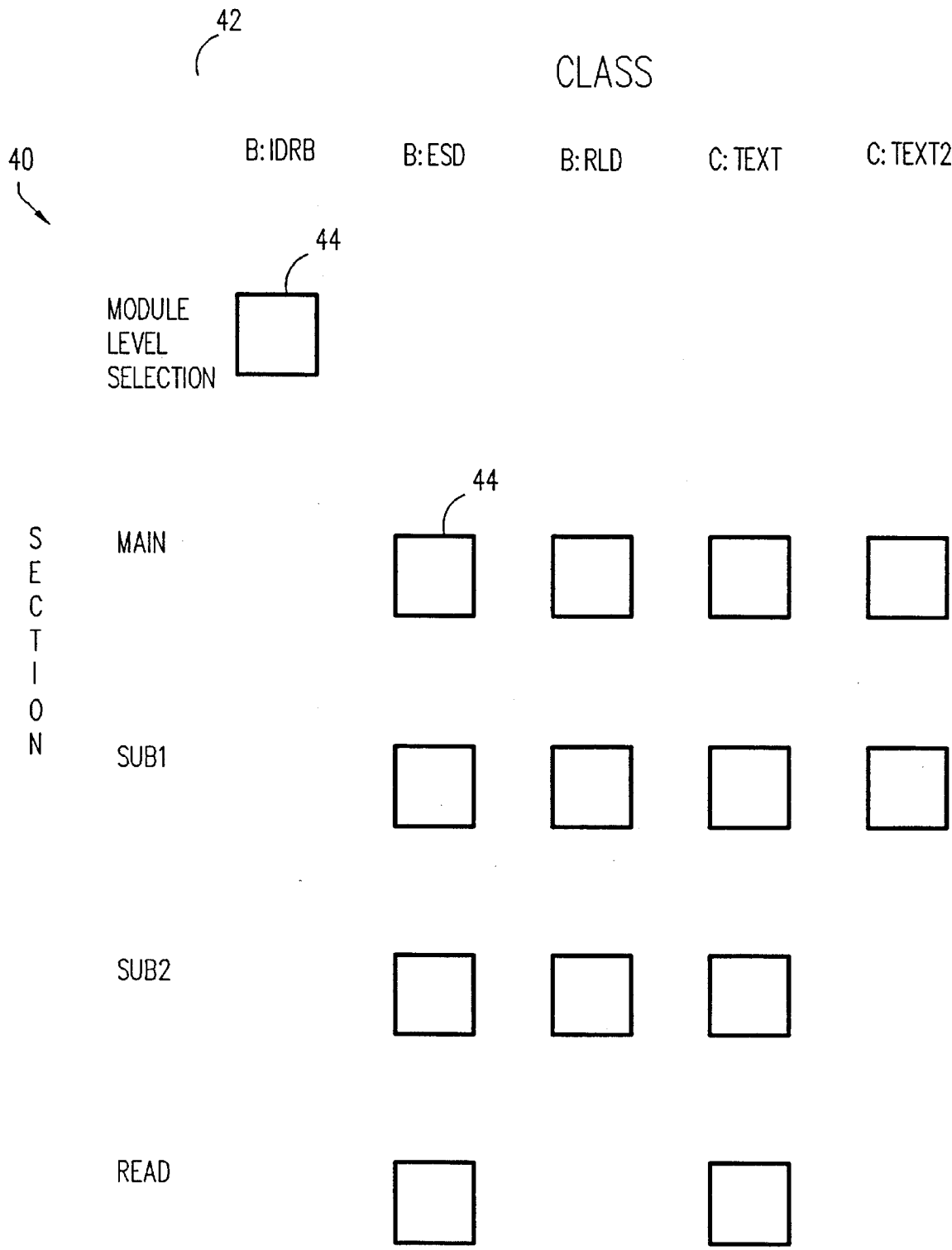
FIG. 4 is a schematic diagram of the logical structure of indexed data in a program object according to the invention.

Referring to FIG. 4, the indexed data consists of a logical array of items, each of which is addressed symbolically by a section name 40 and a class name 42. Each section (i.e., row) is analogous to the compilation unit, and consists of one or more class items. The class represents the type (format and function) of data, such as program text, symbol dictionary, identification data, etc. Each item represents a single class of data within one section (e.g., the 31-bit, shareable, read-only instructions for a subroutine). Unlike the load module, the program object can contain any number of text classes. For that reason, the section can contain any number of text items, which will be managed as a unit. Therefore, it is much less likely that the parts of a single compilation can become separated or lost.

In FIG. 4, an example is shown of a module containing three sections, MAIN, Sub 1, Sub 2 and read. Each box 44 represents a single item which is keyed on section and class. Items need not exist for all section and class combinations. Also, only a few of the available or possible binder-defined classes are shown.

Almost all of the physical limitations of the load module have been eliminated in the program object. Size and offset fields have been increased in width to accommodate large sections and modules. External names, such as entry points and external references, have been removed from all ESD data and replaced by pointers to the names in a string area of the program object. Index numbers, which limit the number of external names and sections, have been widened. The result is a program object which is constrained only by the amount of memory available to bind and execute the program. Extensibility is assured through a flexible convention for class and section names. Section names are assigned by the programmer from the character set defined by the programming language used. Class names are also open-ended, but preferably follow a naming convention to avoid collisions between class names assigned by the programmer, names assigned by the language translators/compilers, and those defined by the binder/linker product. Flexibility is assured through a set of attributes assigned to each class and stored in the class entry in the segment table 31.

Class attributes control the loading and binding of all items in that class, and include, but are not limited to, the following:

Physical organization and record length;

Binding algorithm: How the items within the class are to be structured during binding;

Text/non-text: Can the class contain or be the target of address constants;

Loadable/non-loadable: Should the class be loaded into storage at initial load time;

RMODE: Into what range of addressable storage locations should this segment be loaded;

Shareable/non-shareable: Can the class be shared by more than one task or does each using task need its own copy;

Read-only/read-write: Should the class segment be loaded into write protected storage.

The class attributes are set by the definer of the class. Binder-defined classes, such as ESD (External Symbol Dictionary) and IDR data, are established by the binding program. Compiler-defined classes are established by the compiler or assembler creating the object module. Application-defined classes are normally set by the application programmer. All classes specify attributes from the above set. New attributes can be defined by extending the binder and loader programs to accept and process them. A major advantage of this design is that program text, which formerly was confined to a single, binder-defined text class, can now be subdivided into a number of compiler-defined classes. A single section might consist of (1) read-only code which must run above 16 Mb., (2) code which must run below 16 Mb., (3) static data which can be located above 16 Mb. but not shareable, or (4) external data which is common to all sections, etc. During binding, all of the section contributions to each class are concatenated or overlaid.

Addressability within a section is handled through conventional address constants—regardless of whether class boundaries are being crossed—as is done today and without any special addressability considerations for the programmer. The design just described solves all of the problems discussed previously with current executable program designs, in a consistent and extensible way. By confining the loading and binding variations to a finite set of class attributes, a significant amount of special case logic in the binder and loader programs is greatly reduced. Finally, this design should be applicable to most platforms, although some of the data content would change between processors.

Creating the Program Object

A linker program, called the Program Module Binder, processes object modules, load modules and program objects, creating a single program object. Like a linkage editor, the Binder accepts control statements, giving the user some degree of control over the construction and editing of the module. The resultant program object can either be saved on DASD as a member of a program library or loaded directly into storage and relocated (have its address constants incremented by the load point). For this reason, the Binder serves as both a linker and a linker-loader.

Figure 5:
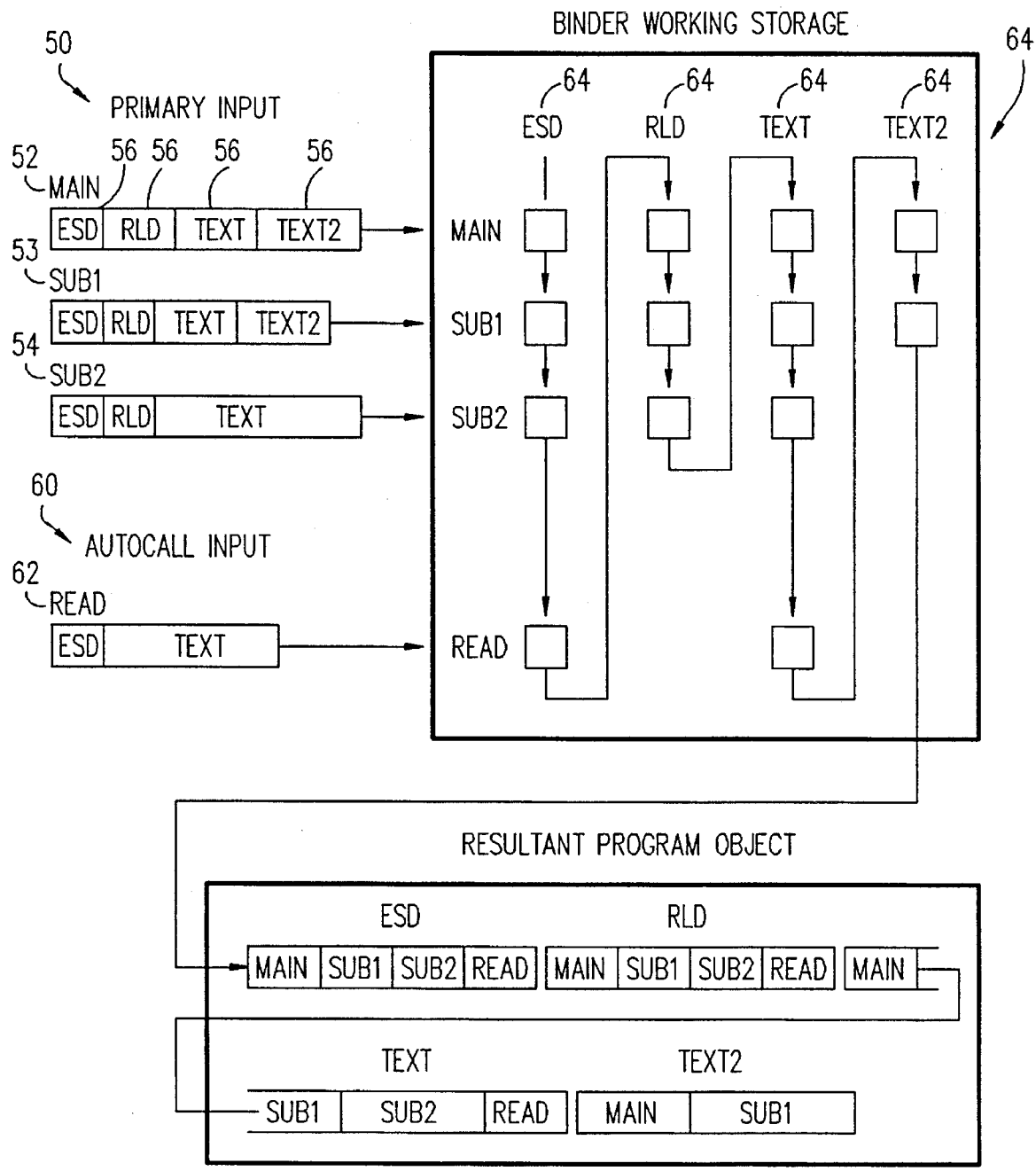
FIG. 5 is a schematic diagram of the process for creating indexed data of a program object as stored on the storage device.

Referring to FIG. 5, the items in an object form of a program are rearranged during binding. The object modules are input to the binder in row-major order, one section at a time. The program object is written out to DASD in column-major order, with all of the sections contributing to a class combined in the class segment. Each loadable text segment (TEXT and TEXT2) are loaded into its own area of virtual storage by the loading process.

The Binder creates a program object using the following process steps:

(1) The primary input phase 50 consists of including modules 52, 53, 54 directly from the input stream or from libraries under direction of control statements in the input stream. Each included file may contain one or more modules, each module contains one or more (control) sections, and each section one or more items 56. All such module data is restructured into internal format and stored in an indexed structure 58 (similar to that shown in FIG. 4).

(2) Editing operations are performed on each included module as it is processed. Editing operations include renaming or deleting external symbols; deleting a section; replacing a section; renaming a section; re-sequencing the sections within the module; and aligning sections on page or other storage boundaries. Editing operations always operate on entire rows (sections), the items of which are inseparable. Since the section corresponds to a compilation unit, there is no possibility of parts of a compilation unit becoming lost or mismatched.

(3) Following the primary input phase, if any external references are still unresolved, a secondary input (autocall) phase 60 is started. Autocall includes additional modules 62 from the link library in an attempt to resolve unresolved references. No additional editing is performed during autocall. Following autocall, the entire module is complete and is structured in a logical array of sections and classes 58 and as shown in FIG. 4.

(4) The Binder then calculates the address of every external label in the module. It does this one column (class) 64 at a time, by reordering and aligning the items according to external specifications. Items are either catenated (placed end-to-end) or overlaid, according to the binding attribute for that class. From the sequence, alignment and size of each of the items, a starting offset for each item and external label is calculated. Locators for all labels in the Binder are class name and offset within the class segment.

(5) Locating each relocatable address constant via the Relocation Dictionary (RLD), the Binder stores its target address in the adcon. Class offsets are stored in the adcon and the class identifier is stored in the RLD entry. A segment table entry is built for each class segment, and will ultimately contain the segment length, name and class attributes.

(6) The program object is then written to DASD or loaded into virtual storage for execution.

When writing out the program object to DASD, the Binder first obtains a contiguous block of buffer storage large enough to contain the entire program object. The binder maps the virtual storage pages to the library member on DASD using available processes from the operating system such as Data-In-Virtual (DIV) (which is a process that is well known to those skilled in the art). It then creates each class segment in the newly-obtained storage, copying the associated items at the calculated offsets within the segment. From control information in the Binder, it builds the program header 34, embedded directory entry table 33, relocation table 32 and segment mapping table 31. It recreates the class/section index in DASD format and moves it into the output buffer. All pages of the program object are written (using DIV) and any aliases and/or alternate entry points are then added to the library directory.

When the module is to be loaded directly rather than creating a program object, then instead of the preceding steps the Binder obtains a block of storage for each "text" segment, as determined by the class attributes, plus one for the ESD segment. It creates each text segment, copying the associated text items at the calculated offsets within the segment. Using available RLD information, it increments each adcon by the virtual address of its (the adcon's) "target" segment. It then passes control to the loaded program.

Most of the process used in creating the program object is common to presently utilized binders and linkage editors creating executable programs. The significant difference lies with the input and output of modules and program objects. The binder allows the aggregation of module data into multiple classes, each of which can be individually loaded. The items are aggregated into classes for efficient loading.

Loading the Program Object

Figure 6:
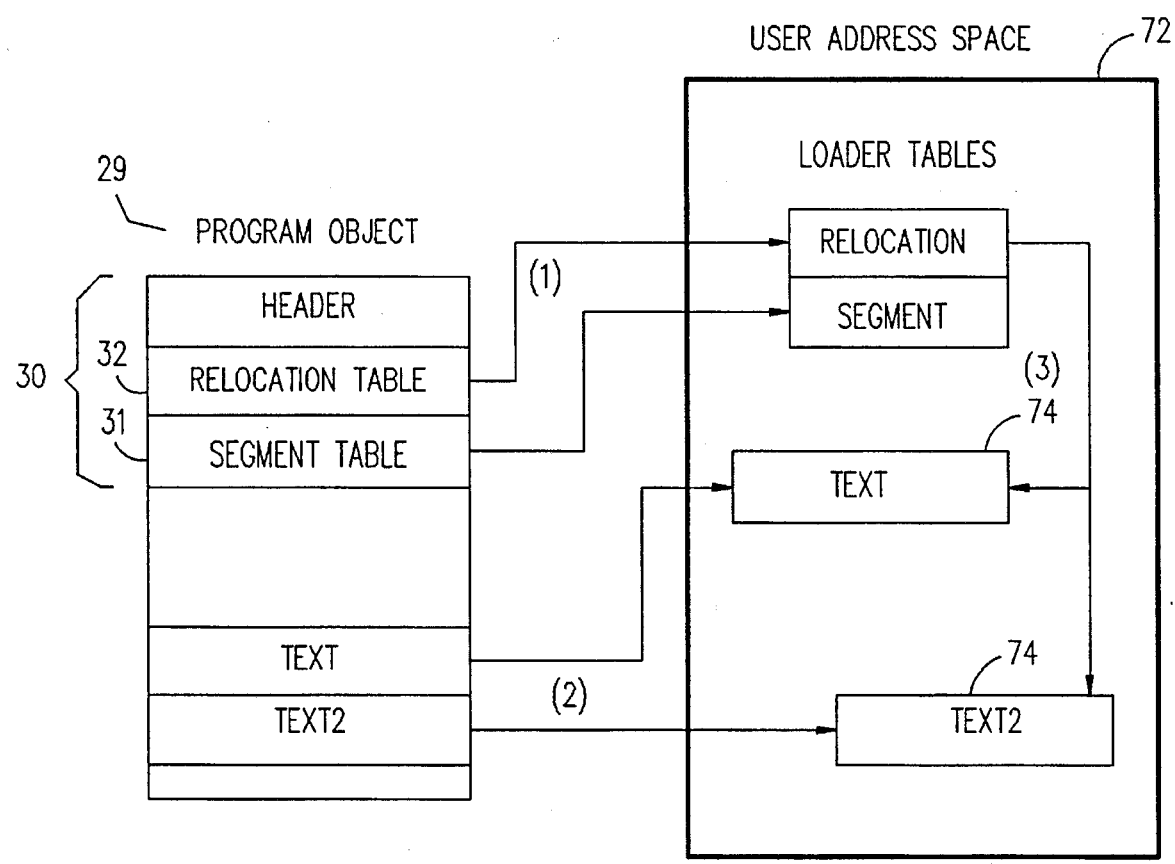
FIG. 6 is a schematic diagram of a program object as loaded into computer memory.

Referring to FIG. 6, loader information is brought into storage 72 from the structural part 30 of the program object 29 Using the segment table entries, a suitable block of storage is obtained for each loadable segment 74. Each loadable segment 74 is brought into its own area of virtual storage. This can be done by reading the program object or through the use of a special routine available through the operating system for reading data into virtual memory in the relocation memory. Next, adcon descriptions in the relocation table 32 are used to increment each address constant by the virtual address of the target segment.

To load a program object into virtual storage, the loader executes the following steps:

(1) The file is opened and the object's structural data is mapped or read into memory. Examining the object's segment table, the loader allocates a block of storage for each "loadable" segment in the object. The length, location and other characteristics of each block of storage will be determined by the class attributes saved in the segment table.

(2) Using the DASD location and length from the segment table, each loadable segment is either read or mapped into virtual storage.

(3) Using the relocation table from the program object, each adcon is incremented by the address of its target segment. Preferably only a subset of program pages would be physically loaded and relocated. This can be accomplished when a segment is mapped using the DIV function rather than being read into memory.

(4) Control is passed to the loaded program.

The use of the DIV (Data-In-Virtual) service of the MVS operating system to load the various class segments into separate areas of virtual storage provides significant performance improvements for large objects where it is possible for the loader to bring in only a small subset of the program pages, relocate any contained adcons (address constants) and place the program into execution. Relocation tables stored in the structural part of the program object permit efficient relocation of adcons by page set. When the executing program references an invalid page (one which has not yet been brought into memory), a page fault will occur, another set of pages will be loaded and relocated. This has the effect of placing a very large program into execution quickly while avoiding the loading of program segments that are seldom used.

It should be understood that the foregoing description is only illustrative of the invention. Various alternatives and modifications can be devised by those skilled in the art without departing from the invention. Accordingly, the present invention is intended to embrace all such alternate modifications and variances which fall within the scope of the appended claims.

What is claimed is:

1. In a computer system having a central processing unit (cpu), memory, and a storage device, a method of preparing at least one object module of data for a computer program, for execution comprising the steps performed by the cpu of:

(a) arranging in memory data from said at least one object module, organized according to a set of pre-determined data classes;

(b) writing out from memory, data, from said at least one object module; to the storage device, keeping data from the same data class, of said set of pre-determined data classes, stored together;

(c) loading into memory from the storage device, data, from said at least one object module, from each data class, of said set of pre-determined data classes, used to begin executing the program; and (d) while executing the program, loading into memory, data, from the storage device, data, from said at least one object module, in each class, of said set of pre-determined data classes, used to continue executing the program.

2. The method of claim 1 further comprising the steps of:

maintaining a directory of where each class of data is stored on the storage device; and at load time, maintaining a directory in memory of each class and where it is stored in memory.

3. The method of claim 1 further comprising the step of storing data for the same module together within the same class.

4. The method of claim 1 wherein an application compiler, application program and application binder, each assign classes to data of the computer program.

5. The method of claim 1 further comprising the step of initially loading a text class comprising executable statements and data into the computer memory for the program to run.

6. The method of claim 1 wherein at least one class comprises data that is loaded above an area of memory and a second class comprises data that is loaded below said area of memory.

7. In a computer system having a central processing unit (cpu), memory, and a storage device, a system for executing a computer program comprising:

means for separating each component of the program into a plurality of predefined classes;

means for writing each component to the storage device, storing each component in the same class, of said plurality of predefined classes, contiguously on the storage device;

means for maintaining a directory of where each class is stored on the storage device; and means for loading into memory only each component in each class, of said plurality of predefined classes, used in executing the program.

8. A computer program product for use with a computer system having a central processing unit (cpu), memory, and a storage device, said computer program product comprising:

a computer usable medium having computer readable program code means embodied in said medium for executing a computer program comprising:

computer readable program code means for separating each component of the program into at least one predefined class;

computer readable program code means for writing each class of components of the program to the storage device, storing each component in the same class, of said plurality of predefined classes, contiguously on the storage device;

computer readable program code means for maintaining a directory of where each class is stored on the storage device; and computer readable program code means for loading into memory, only each component in each class used in executing the program.

\* \* \* \* \*

UNITED STATES PATENT AND TRADEMARK OFFICE
CERTIFICATE OF CORRECTION

PATENT NO. : 5,553,286
DATED : Sep. 3, 1996
INVENTOR(S) : Richard E. Lee

It is certified that error appears in the above-indentified patent and that said Letters Patent is hereby corrected as shown below:

Column 6, line 46, delete "three" and insert --four--

Column 6, line 46, delete "read" and insert --READ--

Signed and Sealed this

Fifteenth Day of April, 1997

Attest:

BRUCE LEHMAN

*Attesting Officer*  *Commissioner of Patents and Trademarks*